Figure 1:
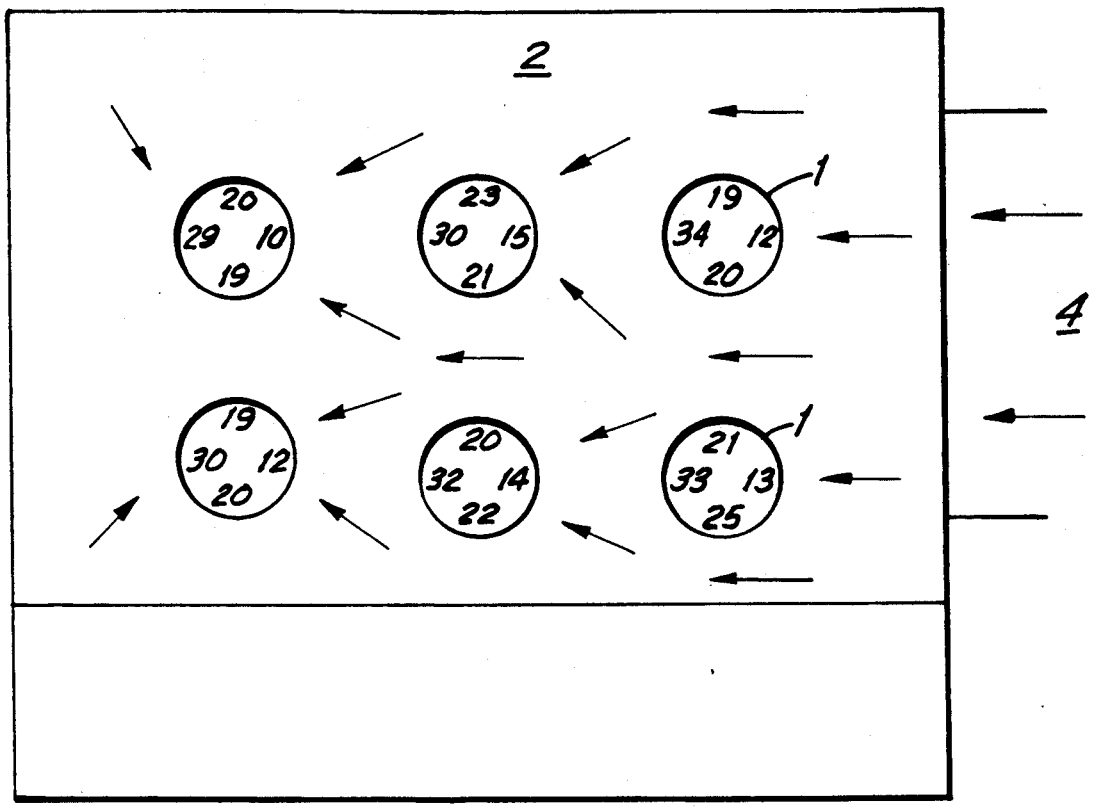

United States Patent [19]

Bergquist et al.

[11] Patent Number: 5,035,067
[45] Date of Patent: Jul. 30, 1991

[54] AIR FLOW CONTROL MECHANISM FOR SPRAY DRYERS

[75] Inventors: Dwight H. Bergquist; Gary D. Lorimor; Thomas E. Wildy, all of Omaha, Nebr.

[73] Assignee: Henningsen Foods, Inc., Omaha, Nebr.

[21] Appl. No.: 514,219

[22] Filed: Apr. 25, 1990

[51] Int. Cl.⁵ ............................................. F26B 19/00
[52] U.S. Cl. .................................... 34/231; 98/40.01; 34/243 R
[58] Field of Search .................. 34/224, 226, 231, 232, 34/233, 243 R; 98/40.01

[56] References Cited

U.S. PATENT DOCUMENTS

| | | | |
|---|---|---|---|
| 1,688,793 | 10/1928 | Schrenkeisen | 34/232 |
| 1,718,845 | 6/1929 | Younger | 34/222 |
| 2,385,962 | 10/1945 | Barnett | 34/224 |
| 4,316,406 | 2/1982 | Lind | 98/40.01 |
| 4,726,285 | 2/1988 | Kelley | 98/40.01 |
| 4,892,030 | 1/1990 | Grieve | 98/40.01 |

Primary Examiner—Henry A. Bennett
Assistant Examiner—Denise L. F. Gromada
Attorney, Agent, or Firm—Stoll, Previto & Hoffman

[57] ABSTRACT

A mechanism for controlling the air flow in a spray dryer having a plurality of air tubes for conducting air into the spray dryer. Each air tube has inner and outer edges. Movable control mechanisms are mounted each air tube which are movable beyond the outer edges of the said air tube.

16 Claims, 2 Drawing Sheets

AIR FLOW CONTROL MECHANISM FOR SPRAY DRYERS

The present invention relates to a mechanism for spray drying of foods and more particularly to a mechanism for controlling the air flow for such spray drying mechanisms.

The normal inlet air system for a multiple spray dryer has several air inlets also called plenum tubes, depending on the capacity of the dryer which carry air from the plenum to the drying chamber. Air enters the plenum through ductwork from the top, bottom, sides or back of the plenum. It is then distributed to each of the plenum tubes where it enters the drying chamber from the plenum through a plurality of the plenum tubes. Spray nozzles are positioned at the center of the plenum tubes to direct a spray into the drying chamber where the product is dried.

It has been found that the air entering the drying chamber through the plenum tubes does not flow uniformly over the entire cross-section of the plenum tubes. It has also been found that the amount of air going through each plenum tube is variable in a multiple nozzle dryer which has multiple plenum tubes. Drying air and air velocity entering is higher in the areas of the plenum opposite the duct work to the plenum than in the areas of the plenum removed therefrom.

This results in inferior or unacceptable mixing of the spray with the drying air so that thermal efficiency is reduced. Moreover, in order to achieve low outlet temperatures, the walls, floors and/or ceilings of the dryer sometimes become wet.

The present invention avoids these problems and has for one of its objects the provision of an improved spray dryer which controls the direction as well as the amount and velocity of drying air flow introduced into a spray drying chamber.

Another object of the present invention is the provision of an improved spray dryer in which the amount and velocity of air entering the drying chamber through the plenum tubes is uniform over the entire cross-section of the plenum tubes.

Another object of the present invention is the provision of an improved spray dryer in which the amount of air entering the drying chamber through plenum tubes is substantially uniform for all the plenum tubes.

Another object of the present invention is the provision of an improved spray dryer in which the velocity of air entering the drying chamber through the plenum tubes is uniform for all the plenum tubes.

Another object of the present invention is the provision of an improved spray dryer in which low outlet temperatures are achieved without wetting the walls, floors or ceilings of the dryer.

Other and further objects of the invention will be obvious upon an understanding of the illustrative embodiment about to be described, or will be indicated in the appended claims and various advantages not referred to herein will occur to one skilled in the art upon employment of the invention in practice.

This is accomplished by using adjustable foils, fins or baffles placed at the inlet of the plenum tubes that feed the drying air from the plenum to the drying chamber. The product is atomized into the drying chamber using spray nozzles, which are at the center of the plenum tubes at the point where air enters the drying chamber. With this structure, the air flow and air velocity is uniform in each plenum tube and around the nozzle so that there will be good mixing of drying air with all of the spray medium. This is done in order to achieve the highest thermal efficiency and lowest outlet temperature possible without wetting walls, floors or ceiling of the dryer.

The invention contemplates the installation of adjustable baffles on the plenum tubes through which the air passes from the plenum to the drying chamber. These baffles are installed so they could be adjusted outwardly toward the plenum or inward toward the drying chamber, depending on the direction and air velocity desired at the plenum tubes. Each of the baffles can be so adjusted that air flow is very uniform over the entire cross-section of each plenum tube.

There may be 4, 8 or 12 multiple baffles per plenum tube. They may be used not only to straighten the air flow, but also to dampen the air flow entering the plenum tubes from the plenum by adjusting the closeness of the baffles to the plenum wall. Thus, the air flow can be adjusted to be substantially the same for each plenum tube and at the same time have uniform cross-sectional air flow through each plenum tube.

The present invention controls the air flow into the dryer, making the amount of air passing through each plenum tube to the drying chamber uniform over the entire cross-section of each plenum tube. In addition, adjustment can also be made so that there is little difference in air flow from inlet to inlet in a multiple nozzle spray dryer.

BRIEF DESCRIPTION OF THE DRAWINGS

A preferred embodiment of the invention has been chosen for purposes of illustration and description and is shown in the accompanying drawings forming a part of the specification, wherein:

FIG. 1 is a schematic view showing the air flow and air velocity through various plenum tubes in accordance with art spray dryers currently in use.

FIG. 2 is a schematic view of a dryer showing the plenum tubes made in accordance with the present invention with the baffles in retracted position.

FIG. 3 is a schematic view similar to FIG. 2 showing the baffles in extended operative position.

FIG. 4 is a schematic view taken along the line of 4—4 of FIG. 2.

FIG. 5 is a schematic view similar to FIG. 1 showing the air flow and air velocity through the plenum tubes in accordance with the present invention.

DESCRIPTION

Referring to the drawings and more particularly to FIG. 1, there is shown schematically an end view of the plenum tubes 1 in a six tube prior art spray dryer currently in use. The plenum tubes 1 are in a standard configuration that has been used for a number of years. The plenum tubes 1 are mounted through the inner plenum wall 2 and connect the plenum 3 with the drying chamber 5, as shown in FIGS. 2 and 3. It will be seen that the drying air represented by the arrows enters the plenum 3 (FIG. 2) from some well known source 4 through suitable ducts (not shown) and goes through the plenum tubes 1 into the drying chamber 5. The numbers on each plenum tube 1, shown on FIG. 1 represent the velocity of the air as it goes through each plenum tube 1. It will be noted that in each instance the areas of the plenum tubes 1 furthest away from the air source 4 has the highest air velocity whereas the areas of the plenum tubes 1 closest to the air source 4 has the lowest air velocity. It is believed that the reason for this non-uniformity is that the walls of the plenum tubes 1 facing the air source 4 act to dampen the flow of the air and slow down the air velocity.

Figure 2:
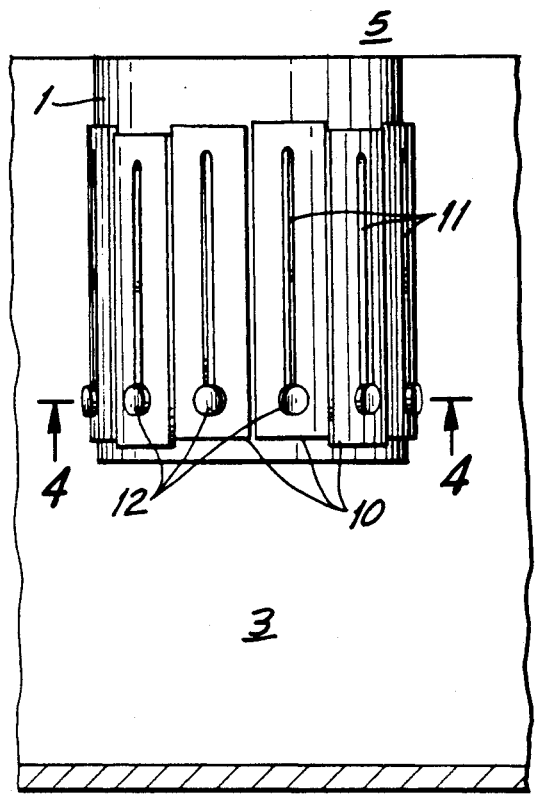
Figure 3:
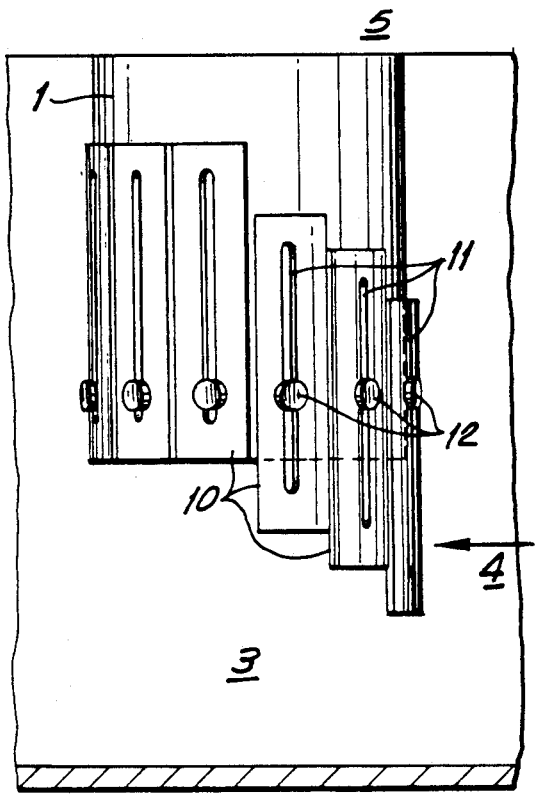
Figure 4:
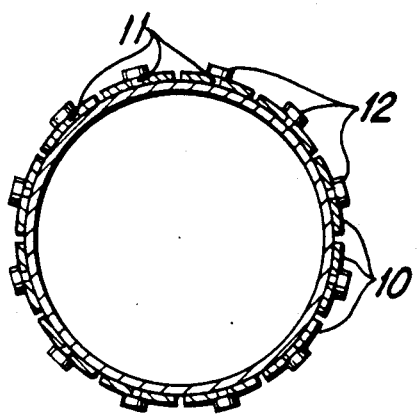

Referring to FIGS. 2–4 which illustrate the preferred embodiment of the present invention, each plenum tube 1 is provided with a plurality of baffles 10 adjustably mounted on the tubes 1 around the outer periphery of each plenum tube 1. The baffles 10 are preferably long and narrow and are provided with elongated slits 11. Retaining elements 12 on each plenum tube 1 extend through the slits 11 of each baffle 10 to hold the baffles on the plenum tubes 1 and permit the baffles 10 to be individually slidably adjustable relative to the plenum tubes 1 and relative to each other.

Referring particularly to FIG. 2, it will be seen that the baffles 10 may all be retracted, i.e., positioned within the confines of the length of the plenum tubes 1. In this position, the baffles 10 have very little or no effect on the velocity and direction of the air going through the plenum tubes 1.

However, as shown in FIG. 3, the baffles 10 may be adjusted relative to the plenum tubes 1 and along retractable elements 12 so that some selected ones extend beyond the ends of the plenum tubes 1 for different distances. In the particular arrangement shown in FIG. 3, those baffles 10 facing the path of the drying air being fed into the plenum 3 from the air source 4 have been extended and those baffles 10 facing away from the path of the drying air will remain substantially within the confines of the ends of the plenum tube 1.

With this structure, the movement of the drying air is partially blocked by the extended baffles 10 so that the air does not directly reach the opposite walls of the plenum tubes 1. Hence, the air moving along the opposite walls of the plenum tubes 1 is somewhat slowed. The positions of the baffles 10 may be adjusted so that the velocity of the air moving along all the inner walls of the plenum tubes 1 is substantially the same throughout.

Figure 5:
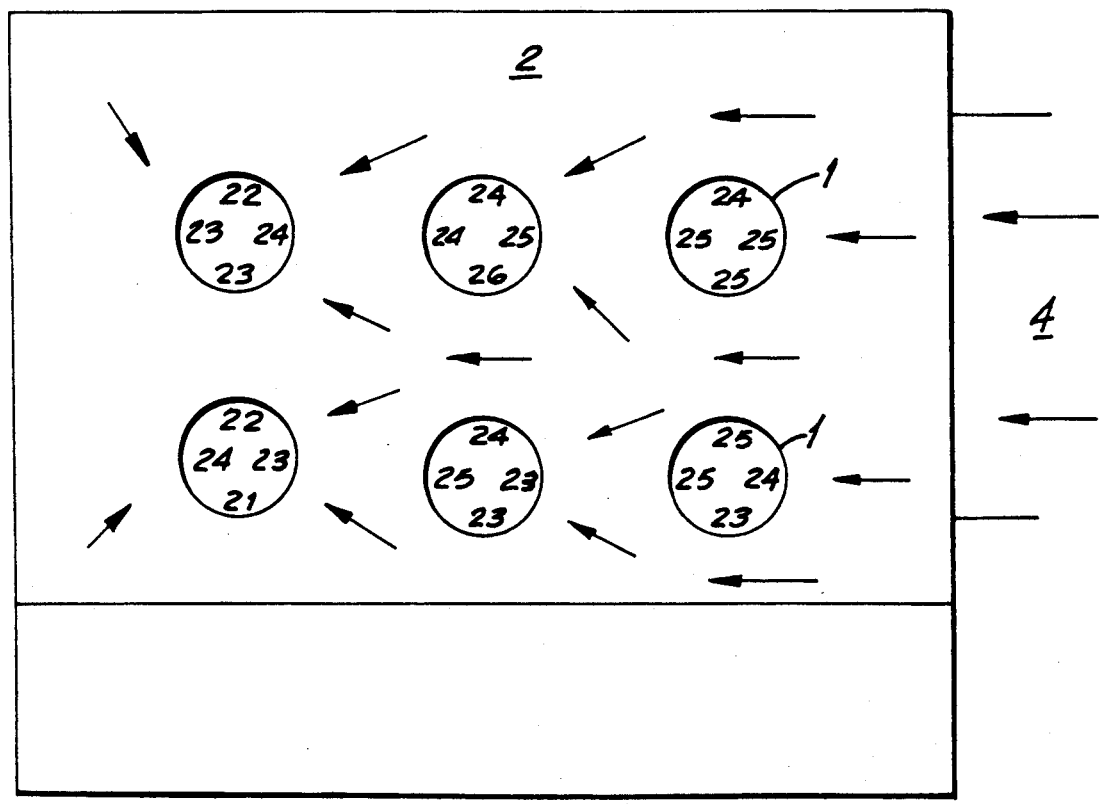

This is illustrated in FIG. 5 which shows the same six plenum dryer as shown in FIG. 1 with the invention in place. It will be noted that the air velocity along all the inner walls of the plenum tube 1 is substantially equal. It is also evident that the velocity of air moving through all the plenum tubes 1 substantially equal regardless of the position of the plenum tubes 1 on the plenum wall 2.

It will thus be seen that the present invention provides an improved spray dryer which controls the direction as well as the velocity of drying air flow introduced into a spray drying chamber, in which the air flow and air velocity entering the drying chamber through the plenum tubes is uniform over the entire cross-section of the plenum tubes and is substantially uniform for all the plenum tubes and in which low outlet temperatures are achieved without wetting the walls, floors or ceilings of the dryer.

As many and varied modifications of the subject matter of this invention will become apparent to those skilled in the art from the detailed description given hereinabove, it will be understood that the present invention is limited only as provided in the claims appended hereto.

The embodiments of the invention in which an exclusive property or privilege is claimed are defined as follows:

1. A mechanism for controlling the air flow in a spray dryer comprising at least one air tube for conducting air into the spray dryer, said air tube having an axis and inner and outer edges substantially perpendicular to said axis, a plurality of individual control means movably mounted on the perimeter of said air tube, said control means being movable in a direction parallel to said axis beyond the outer edges of the said air tube.

2. A mechanism as set forth in claim 1 wherein a plurality of said movable control means are mounted on said air tube and are individually movable relative to each other and relative to the edges of said air tube.

3. A mechanism as set forth in claim 2 wherein said movable control means comprise baffles.

4. A mechanism as set forth in claim 3 wherein said baffles are mounted around the periphery of said air tube.

5. A mechanism as set forth in claim 4 wherein said baffles are mounted parallel to the axis of said air tube.

6. A mechanism as set forth in claim 5 wherein said baffles are mounted on pins on said air tube.

7. A mechanism as set forth in claim 6 wherein said baffles are provided with slots through which said pins extend.

8. A mechanism as set forth in claim 7 wherein said baffles are mounted on the outside of said air tube.

9. A spray dryer comprising means for controlling the air flow therein, at least one air tube for conducting air into the spray dryer, said air tube having an axis and inner and outer edges substantially perpendicular to said axis, a plurality of individual control means movably mounted on the perimeter of said air tube, said control means being movable in a direction parallel to said axis.

10. A spray dryer as set forth in claim 9 wherein a plurality of said movable control means are mounted on said air tube and are individually movable relative to each other and relative to the edges of said air tube.

11. A spray dryer as set forth in claim 10 wherein said movable control means comprise baffles.

12. A spray dryer as set forth in claim 11 wherein said baffles are mounted around the periphery of said air tube.

13. A spray dryer as set forth in claim 12 wherein said baffles are mounted parallel to the axis of said air tube.

14. A spray dryer as set forth in claim 13 wherein said baffles are mounted on pins on said air tube.

15. A spray dryer as set forth in claim 14 wherein said baffles are provided with slots through which said pins extend.

16. A spray dryer as set forth in claim 15 wherein said baffles are mounted on the outside of said air tube.

* * * * *